US010481253B1

(12) United States Patent
Hollenbeck et al.

(10) Patent No.: US 10,481,253 B1
(45) Date of Patent: Nov. 19, 2019

(54) LOW-PROFILE MONOPULSE TRACKER

(71) Applicant: L-3 Communications Corp., New York, NY (US)

(72) Inventors: Michael C Hollenbeck, Elmhurst, NY (US); Sy Prestwich, Riverton, UT (US); Jeffrey B Bench, Lehi, UT (US)

(73) Assignee: L-3 Communications Corp., New York, NY (US)

( * ) Notice: Subject to any disclaimer, the term of this patent is extended or adjusted under 35 U.S.C. 154(b) by 343 days.

(21) Appl. No.: 15/341,281

(22) Filed: Nov. 2, 2016

(51) Int. Cl.
*G01S 13/68* (2006.01)
*G01S 13/44* (2006.01)

(52) U.S. Cl.
CPC .............. *G01S 13/68* (2013.01); *G01S 13/44* (2013.01)

(58) Field of Classification Search
CPC ...... G01S 13/44; G01S 13/4436; G01S 13/68; G01S 2007/027; G01S 2007/028; H01Q 25/004; H01Q 25/00; H01Q 25/02; H01Q 25/005; H01Q 21/06; H01Q 21/061; H01Q 21/065; H01Q 21/08; H01Q 19/106; H01Q 19/18; H01Q 19/185; H01Q 5/00; H01Q 5/20; H01Q 5/30; H01Q 1/36; H01Q 1/44
See application file for complete search history.

(56) References Cited

U.S. PATENT DOCUMENTS

| | | | | | |
|---|---|---|---|---|---|
| 5,059,968 | A | * | 10/1991 | Thompson | G01S 13/4436 342/150 |
| 5,995,062 | A | * | 11/1999 | Denney | H01Q 1/1235 343/700 MS |
| 6,292,134 | B1 | * | 9/2001 | Bondyopadhyay | H01Q 3/242 342/374 |
| 6,320,541 | B1 | * | 11/2001 | Pozgay | G01S 13/44 342/149 |
| 6,433,742 | B1 | * | 8/2002 | Crawford | H01Q 1/242 343/700 MS |
| 6,456,238 | B1 | * | 9/2002 | Posey | G01S 13/44 342/149 |
| 8,933,836 | B1 | * | 1/2015 | Woodell | G01S 7/4026 342/149 |
| 2007/0182619 | A1 | * | 8/2007 | Honda | G01S 13/931 342/80 |
| 2008/0122683 | A1 | * | 5/2008 | Howley | G01S 3/04 342/149 |
| 2009/0021429 | A1 | * | 1/2009 | Colburn | H01Q 25/02 342/374 |
| 2010/0066627 | A1 | * | 3/2010 | Parsche | H01Q 7/00 343/795 |

(Continued)

*Primary Examiner* — Bernarr E Gregory
*Assistant Examiner* — Daniel P Malley, Sr.
(74) *Attorney, Agent, or Firm* — Kirton McConkie; Brian Tucker

(57) ABSTRACT

A monopulse tracker includes multiple dual-axis monopulse antenna systems that are angled with respect to one another. The orientations of the monopulse antenna systems create a much larger field of view for the monopulse tracker to eliminate the need to steer the monopulse tracker. The monopulse tracker can be configured to estimate a position of an object based on tracking information received from more than one monopulse antenna system therefore increasing the accuracy of the estimated position. The multiple monopulse antenna systems can be arranged in a low-profile housing to facilitate use of the monopulse tracker on aircraft.

20 Claims, 11 Drawing Sheets

(56) References Cited

U.S. PATENT DOCUMENTS

| | | | |
|---|---|---|---|
| 2011/0215963 A1* | 9/2011 | Perl | H01Q 25/00 342/156 |
| 2012/0181374 A1* | 7/2012 | Williams | H01Q 1/281 244/3.19 |
| 2013/0113651 A1* | 5/2013 | Leise | H01Q 3/26 342/146 |
| 2017/0047649 A1* | 2/2017 | Himmelstoss | H01Q 1/3233 |
| 2018/0019524 A1* | 1/2018 | Matsuki | G01S 13/4454 |

* cited by examiner

LOW-PROFILE MONOPULSE TRACKER

CROSS-REFERENCE TO RELATED APPLICATIONS

N/A

BACKGROUND

A monopulse antenna system is commonly used to implement radar tracking. As its name implies, for a radar application a monopulse antenna system employs a single pulse to identify the presence of an object in the field of view. This is possible due to the use of multiple antenna elements which can detect angle information from the received signal. A monopulse antenna system can also be used to track intentional radiators.

FIG. 1 illustrates an example block diagram of a typical dual-axis monopulse antenna system. As shown, a dual-axis monopulse antenna system may include four antenna elements (A, B, C, and D) each of which receive the same signal. If an object is in the field of view of the monopulse antenna system, each antenna element will receive the reflected signal. These received signals (which are referred to as A, B, C, and D respectively) are then fed to a comparator network.

Due primarily to the slight differences in the positions/orientations of the antenna elements, the characteristics of the received signals will vary. The comparator network can detect these variations to allow the relative location of the object with respect to the boresight axis to be determined. In particular, the comparator network can generate three tracking channels: (1) a sum ($\Sigma$) of the four received signals; (2) an azimuth difference ($\Delta_{az}$); and (3) an elevation difference ($\Delta_{el}$). As one of skill in the art would understand how these tracking channels can be employed to identify and track the position of an object, no further description will be provided.

In typical monopulse antenna systems, the system is steered so that the object to be tracked will remain in the field of view. To facilitate steering, the monopulse antenna system is typically mounted to a pedestal. However, such configurations may be undesirable in many situations such as on aircraft where a pedestal-mounted system would require undesirable aircraft fuselage changes to accommodate the system and to minimize drag.

BRIEF SUMMARY

The present invention extends to a low-profile monopulse tracker. The monopulse tracker of the present invention includes multiple monopulse antenna systems that are angled with respect to one another. As an example, a monopulse tracker can include a top surface and a number of side surfaces angled from the top surface each of which house a monopulse antenna system. The orientations of the monopulse antenna systems create a much larger field of view for the monopulse tracker due to the boresight axis of each system pointed in a different direction.

Each of the monopulse antenna systems can independently generate three tracking channels ($\Sigma$, $\Delta_{az}$, and $\Delta_{el}$) which can then be employed to generate ratios representing the azimuth and elevation angles of the object relative to the boresight axis of the respective monopulse antenna system. Because of the orientations of the monopulse antenna systems, a tracked object (e.g., a projectile) will likely be within the field of view of multiple monopulse antenna systems such that, at any given time, multiple monopulse antenna systems will generate ratios representing the azimuth and elevation angles of the tracked object relative to the boresight axis of the respective monopulse antenna system. The monopulse tracker can include a position estimator which receives these ratios and calculates a precise position of the object relative to the monopulse tracker. Also, because of the orientation of the monopulse antenna systems, the object will likely remain in the field of view of at least one monopulse antenna system even when the position of the object relative to the monopulse tracker changes. In this way, the monopulse tracker can continue to track a moving object without the need of steering.

In one embodiment, the present invention can be implemented as a monopulse tracker that includes a housing having a first surface containing a monopulse antenna system and multiple additional surfaces angled from the first surface, each of which may also contain a monopulse antenna system. The monopulse tracker can also include one or more comparators configured to generate a sum channel, an elevation difference channel, and an azimuth difference channel for each of the monopulse antenna systems, as well as one or more monopulse detector assemblies configured to generate an elevation ratio and an azimuth ratio for each monopulse antenna system by processing the sum channel, the elevation difference channel, and the azimuth difference channel for the monopulse antenna system. The monopulse tracker may further include a position estimator configured to receive the elevation ratio and the azimuth ratio generated for each of the monopulse antenna systems and to generate an estimated position of an object based on the received elevation and azimuth ratios.

In another embodiment, the present invention can be implemented as a monopulse tracker that comprises a housing having a top surface that extends along a plane defined by a first axis and a second axis, a first set of side surfaces that extend downwardly from opposing sides of the top surface along the first axis, and a second set of side surfaces that extend downwardly from opposing sides of the top surface along the second axis. The top surface and each side surface include a monopulse antenna system. The monopulse tracker can also comprise circuitry configured to generate, for each monopulse antenna system, elevation and azimuth ratios, and a position estimator configured to receive the elevation and azimuth ratios and to estimate a position of an object based on the elevation and azimuth ratios for one or more of the monopulse antenna systems.

In another embodiment, the present invention can be implemented as a method for estimating a position of an object using a monopulse tracker that includes multiple monopulse antenna systems without steering the monopulse tracker. Elevation and azimuth ratios can be received for each of two or more monopulse antenna systems that are positioned in the monopulse tracker in different orientations. For each of the two or more monopulse antenna systems, the elevation and azimuth ratios can be processed to calculate a position of an object relative to a boresight angle of the monopulse antenna system. Based on known orientation information defining a boresight angle of each of the two or more monopulse antenna systems, the two or more calculated positions can be combined to generate a single estimated position of an object in a field of view of the two or more monopulse antenna systems.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
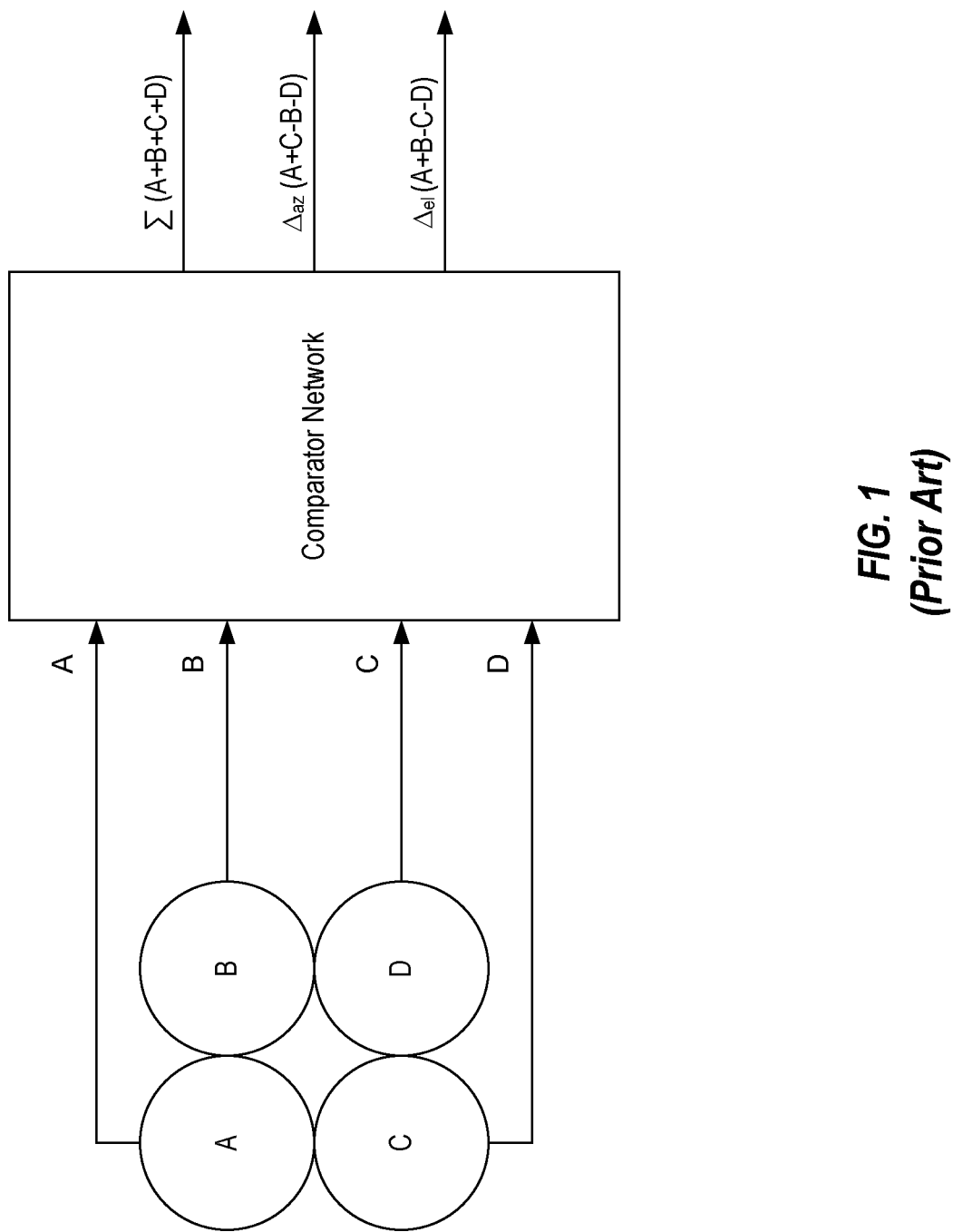
FIG. 1 provides a block diagram of a typical monopulse antenna system.
Figure 2:
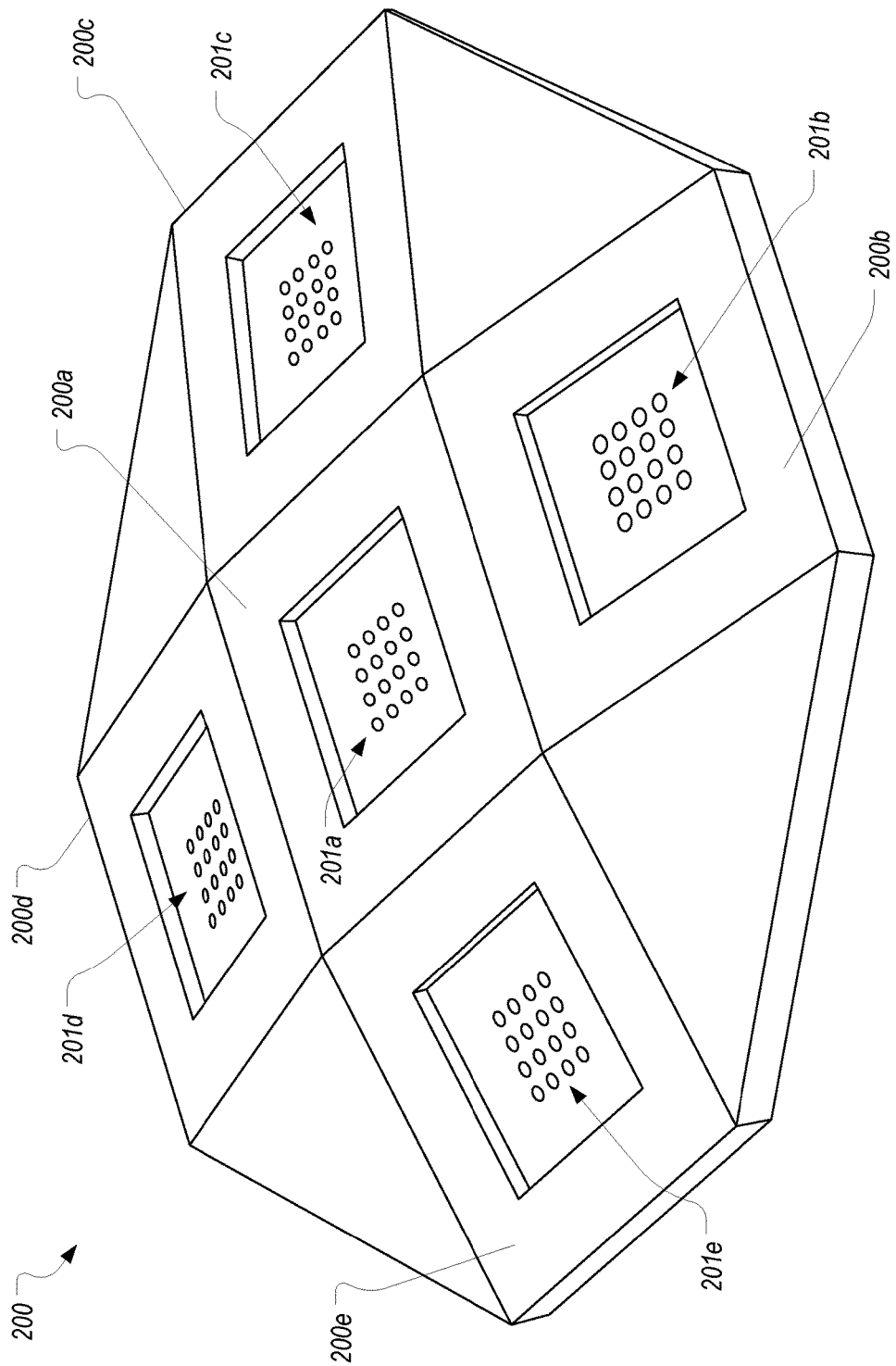
FIG. 2 illustrates an example of a monopulse tracker that is configured in accordance with one or more embodiments of the present invention.

FIG. 2 illustrates an example of a low-profile monopulse tracker 200 that is configured in accordance with one or more embodiments of the present invention. As shown, monopulse tracker 200 can comprise a housing having a pyramid shape forming a top surface 200a and four side surfaces 200b-200e that are each angled relative to top surface 200a. Top surface 200a extends in a plane having a first and second axis as identified in FIG. 2B. Side surfaces 200b and 200d are positioned on opposite sides of top surface 200a and are aligned with top surface 200a along the first axis. Similarly, side surfaces 200c and 200e are positioned on opposite sides of top surface 200a but are aligned with top surface 200a along the second axis.

Figure 2A:
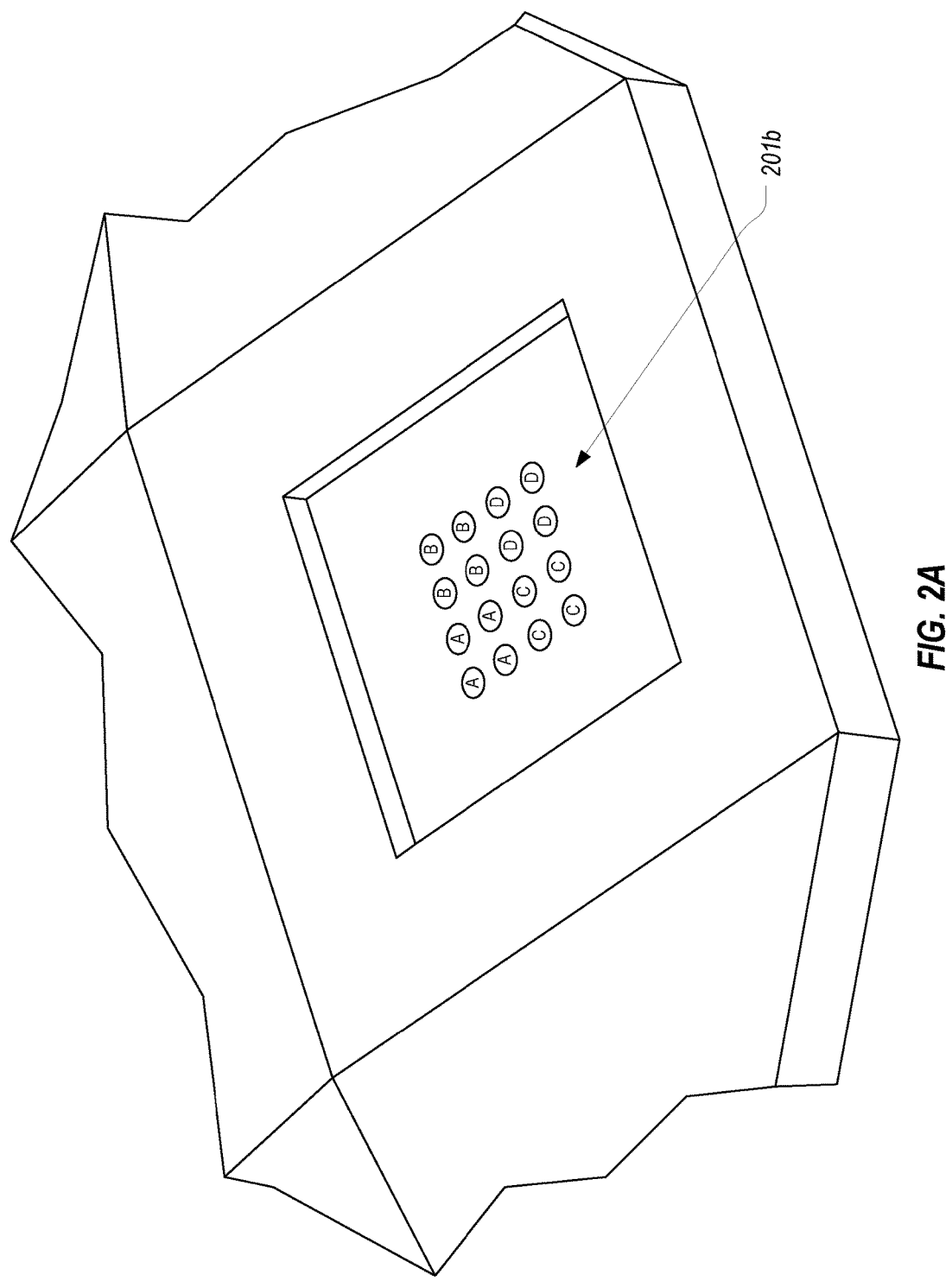
FIG. 2A provides a close-up view of one monopulse antenna system of the monopulse tracker shown in FIG. 2.
Figure 2B:
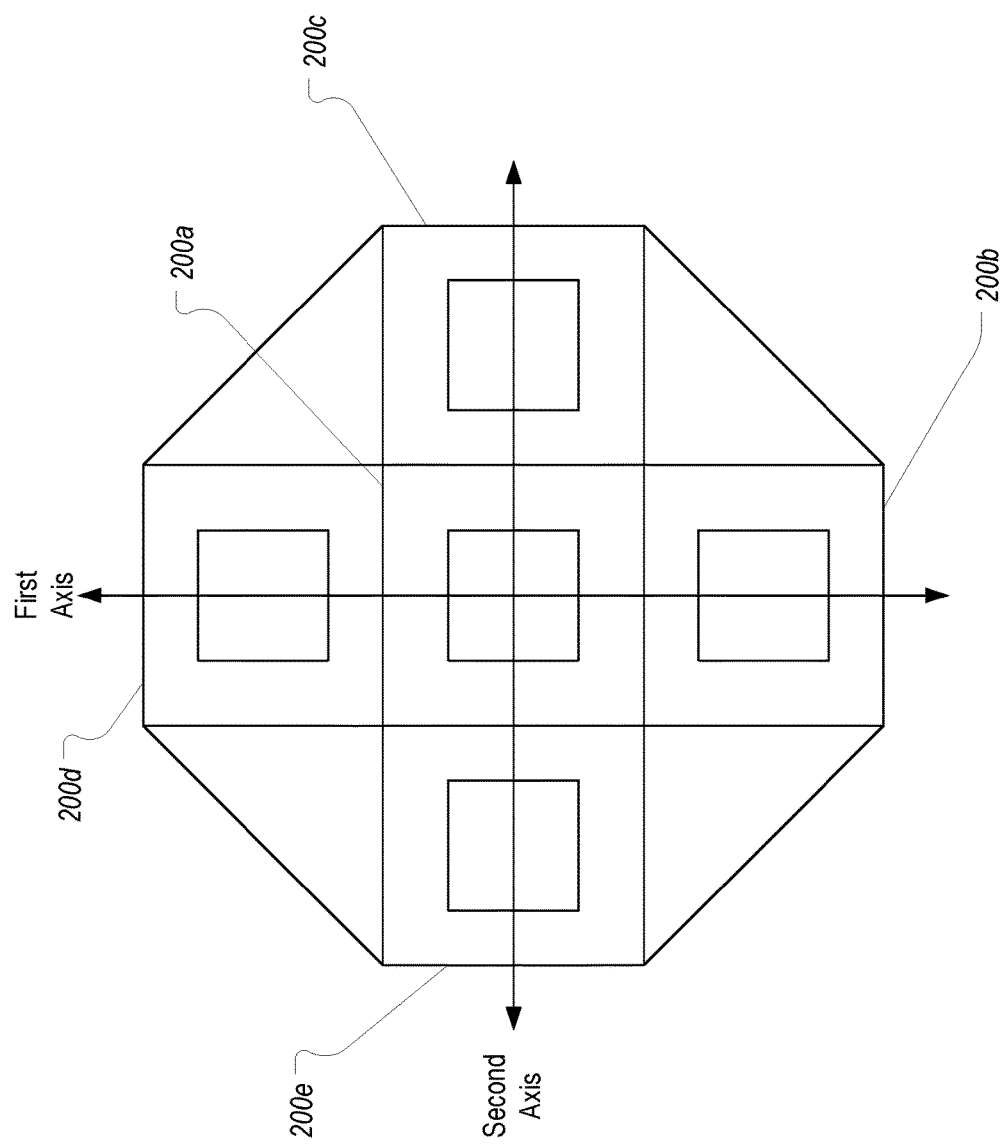
FIG. 2B illustrates a top view of the monopulse tracker of FIG. 2.

Each of surfaces 200a-200e includes a monopulse antenna system 201a-201e respectively. Each monopulse antenna system 201a-201e can preferably be a planar dual-axis monopulse antenna system. As is known in the art, any multiple of four antenna elements may be employed to implement a dual-axis monopulse antenna system. For example, in FIG. 2, a 16 (or four-by-four) element array is employed. FIG. 2A identifies how the individual antenna elements can be combined to generate the A, B, C, and D signals described in the background. Although the present invention will describe embodiments in which each monopulse antenna system is a dual-axis system, using the techniques of the present invention, a monopulse tracker could also be implemented using single-axis monopulse antenna systems.

As indicated above, each of side surfaces 200b-200e can be angled or tilted downwardly from top surface 200a. In particular, side surfaces 200b and 200d can be angled downwardly along the first axis, while side surfaces 200c and 200e can be angled downwardly along the second axis. Due to this angling of the side surfaces, the field of view of each of monopulse antenna systems 201b-201e will also be angled away from the field of view of monopulse antenna system 201a. By way of example only, side surfaces 200b-200e can each be angled such that the boresight angle of monopulse antenna systems 201b-201e is tilted at 8° from the boresight angle of monopulse antenna system 201a. Of course, side surfaces 200b-200e could be oriented at different angles.

Each of monopulse antenna systems 201a-201e can be configured to have a substantial beamwidth (e.g., 25°), which, in some embodiments, can be accomplished by using the four element array mentioned above as opposed to a 16 element array. By producing a wide beamwidth, the combined field of view of monopulse tracker 200 will encompass a large area of the sky. In other words, at any given time, an object will likely be within the field of view of at least one of monopulse antenna systems 201a-201e even as the object moves relative to monopulse tracker 200. As a result, an object can be tracked over a large range without needing to steer monopulse tracker 200. Accordingly, monopulse tracker 200 can easily be employed on an aircraft (e.g., by simply mounting monopulse tracker 200 directly to the aircraft's body) to track a projectile. Also, the low-profile nature of monopulse tracker 200 (e.g., a height of approximately 4 cm) simplifies installation on aircraft and will minimize any drag during flight. Of course, monopulse tracker 200 could also be used in other scenarios and should therefore not be limited to use on an aircraft.

Additionally, during tracking, an object may likely be within the field of view of more than one of monopulse antenna systems 201a-201e. Therefore, as will be described in detail below, a very accurate estimate of the object's location can be calculated by using information (e.g., elevation ratio, azimuth ratio, and/or sum channel power level) representing the object's position produced by more than one monopulse antenna system. As such, monopulse tracker 200 is a highly accurate solution for tracking an object without needing to steer a monopulse antenna system.

Figure 3:
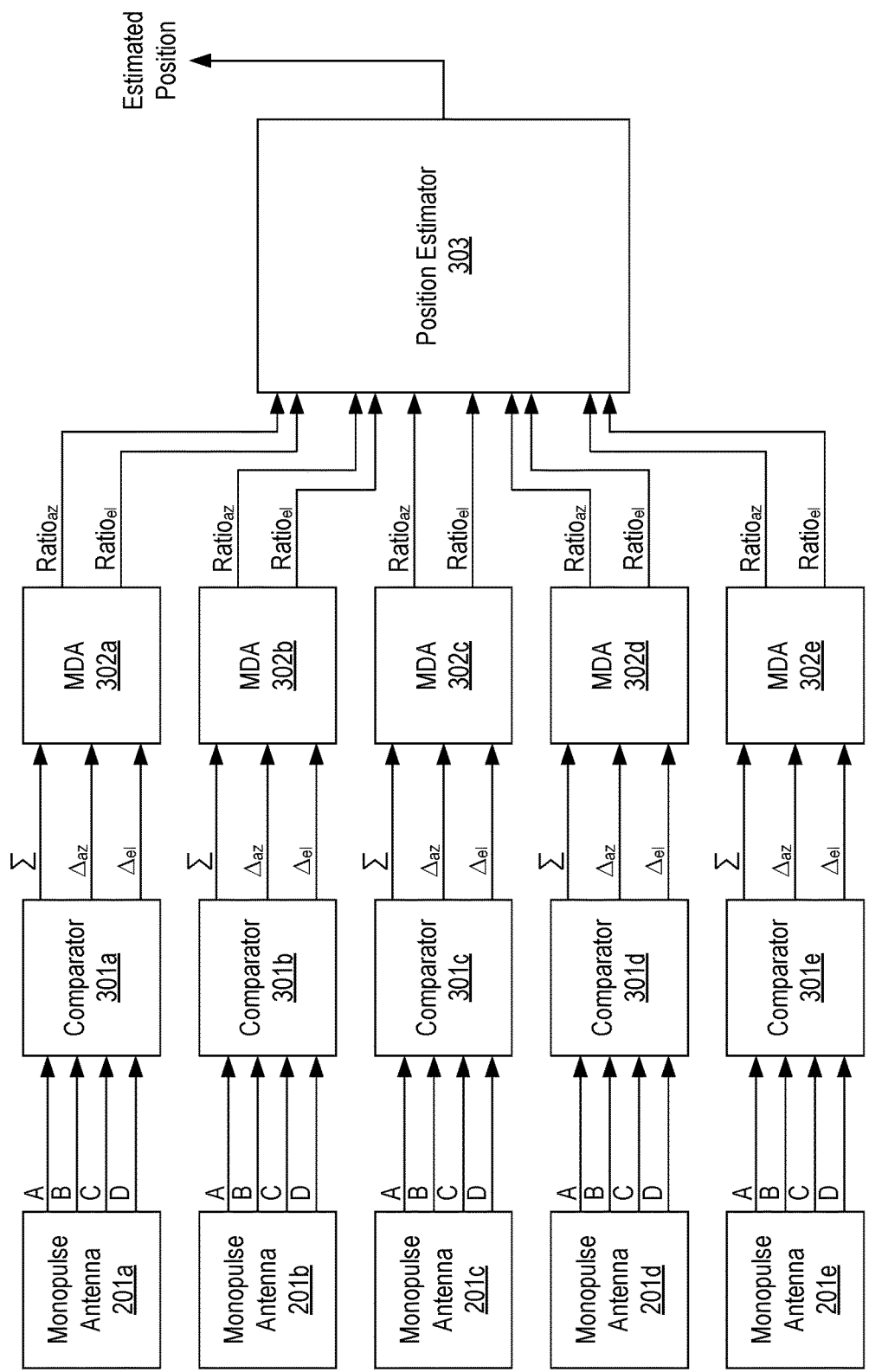
FIG. 3 provides a block diagram of the circuitry of a monopulse tracker configured in accordance with one or more embodiments of the present invention.

Turning now to FIG. 3, a block diagram of the internal circuitry of monopulse tracker 200 is provided. Each of monopulse antenna systems 201a-201e is shown as producing signals A, B, C, and D which are then fed to a corresponding comparator 301a-301e to generate the sum ($\Sigma$) azimuth difference ($\Delta_{az}$), and elevation difference ($\Delta_{el}$) channels as is known in the art. The three channels produced by each of comparators 301a-301e are then fed into a corresponding Monopulse Detector Assembly (MDA) 302a-302e which produces two ratios from the channels: (1) an azimuth-to-sum ratio ($\text{Ratio}_{az}$) indicative of the azimuth error (i.e., an object's azimuth angle of deviation from the boresight axis); and (2) an elevation-to-sum ratio ($\text{Ratio}_{el}$) indicative of the elevation error (i.e., the object's elevation angle of deviation from the boresight axis). In some embodiments, these ratios can be generated in accordance with the following equations:

$$\text{Ratio}_{az} = \frac{\Delta_{el}}{\Sigma}$$

$$\text{Ratio}_{el} = \frac{\Delta_{az}}{\Sigma}$$

Because monopulse tracker 200 includes five monopulse antenna systems, a total of ten ratios (five azimuth ratios and five elevation ratios) will be generated and input to a position estimator 303. As will be further described below, position estimator 303 can be configured to calculate a location of an object based on these ratios.

Figure 3A:
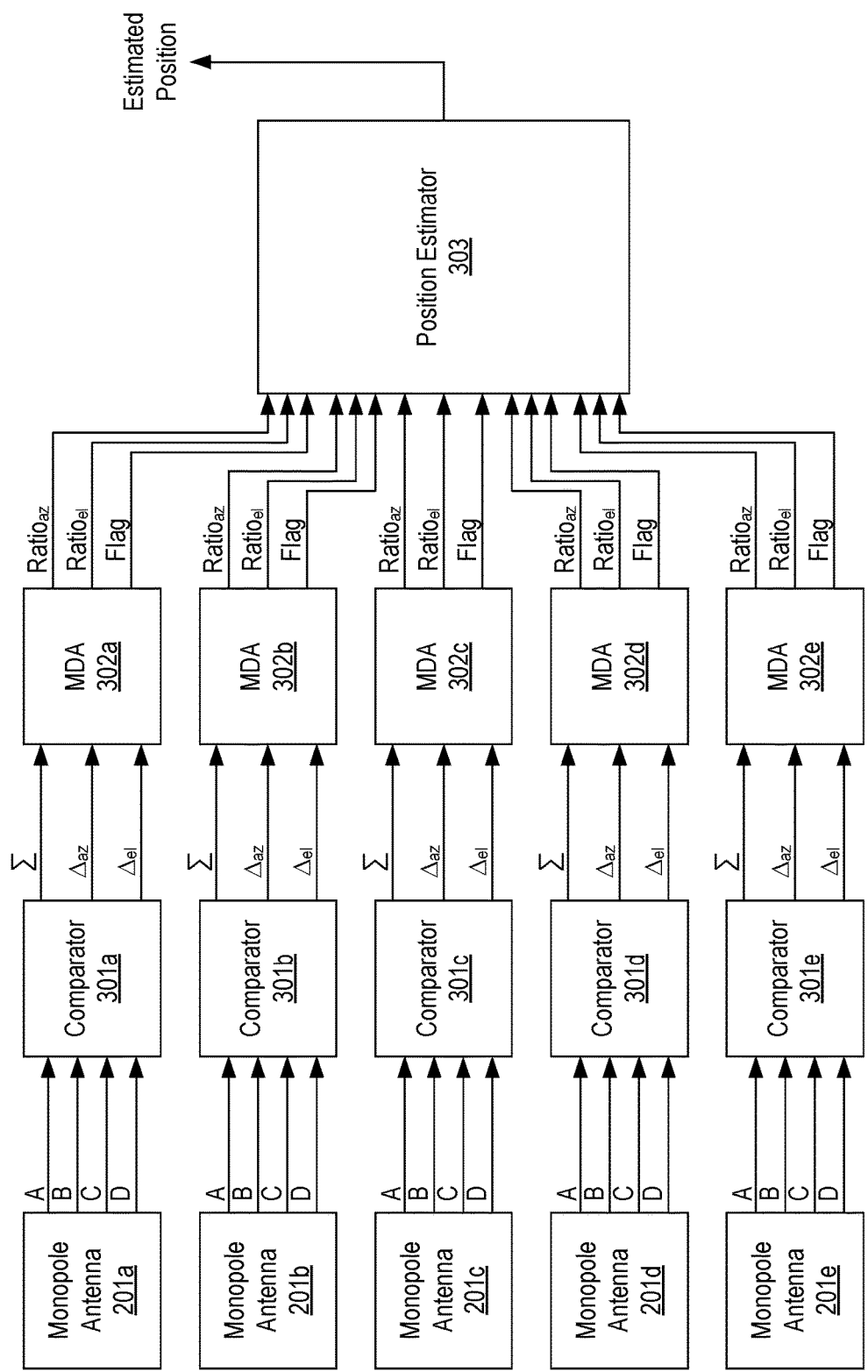
FIG. 3A provides another block diagram of the circuitry of a monopulse tracker configured in accordance with one or more embodiments of the present invention.

At any given time, it is likely that an object will be in the field of view of only a subset (e.g., between one and three) of the monopulse antenna systems. Monopulse tracker 200 may typically be configured such that each of MDAs 302a-302e will continuously produce ratios (i.e., regardless of whether an object is within the field of view of the corresponding antenna). Therefore, at any given time, only some of the ratios received by position estimator 303 will be valid/useful (i.e., only some of the ratios will represent the presence of an object). To allow position estimator 303 to identify which ratios should be used in calculating the location of an object, each of MDAs 302a-302e may generate a flag (or other discrimination information) identifying whether the current ratios are valid as is shown in FIG. 3A. Based on the value of these flags, position estimator 303 can determine whether to employ the corresponding ratios to calculate the position of an object. In some embodiments, an MDA can determine whether ratios are valid by comparing the power level of the sum channel to the power levels of the difference channels. In particular, an MDA may set the value of the flag to indicate valid ratios only when the power level of the sum channel exceeds the power level of the azimuth difference channel and the power level of the elevation difference channel.

Although FIGS. 3 and 3A each represent embodiments where a separate MDA is employed for each monopulse antenna, in some embodiments, a single MDA may be employed. This can be accomplished by time-multiplexing the operations performed by a single MDA. In particular, the three-channel outputs from monopulse antenna systems 201a-201e and comparators 301a-301e could be input to a single MDA which would compute the position ratios for each comparator in different time-slices. A single MDA could therefore receive the three channels from each comparator and generate the corresponding ratios (and possibly the flag) in quick succession for input to position estimator 303. Once position estimator 303 receives the ratios for each monopulse antenna system, it could then update its estimated position for the object.

Figure 4:
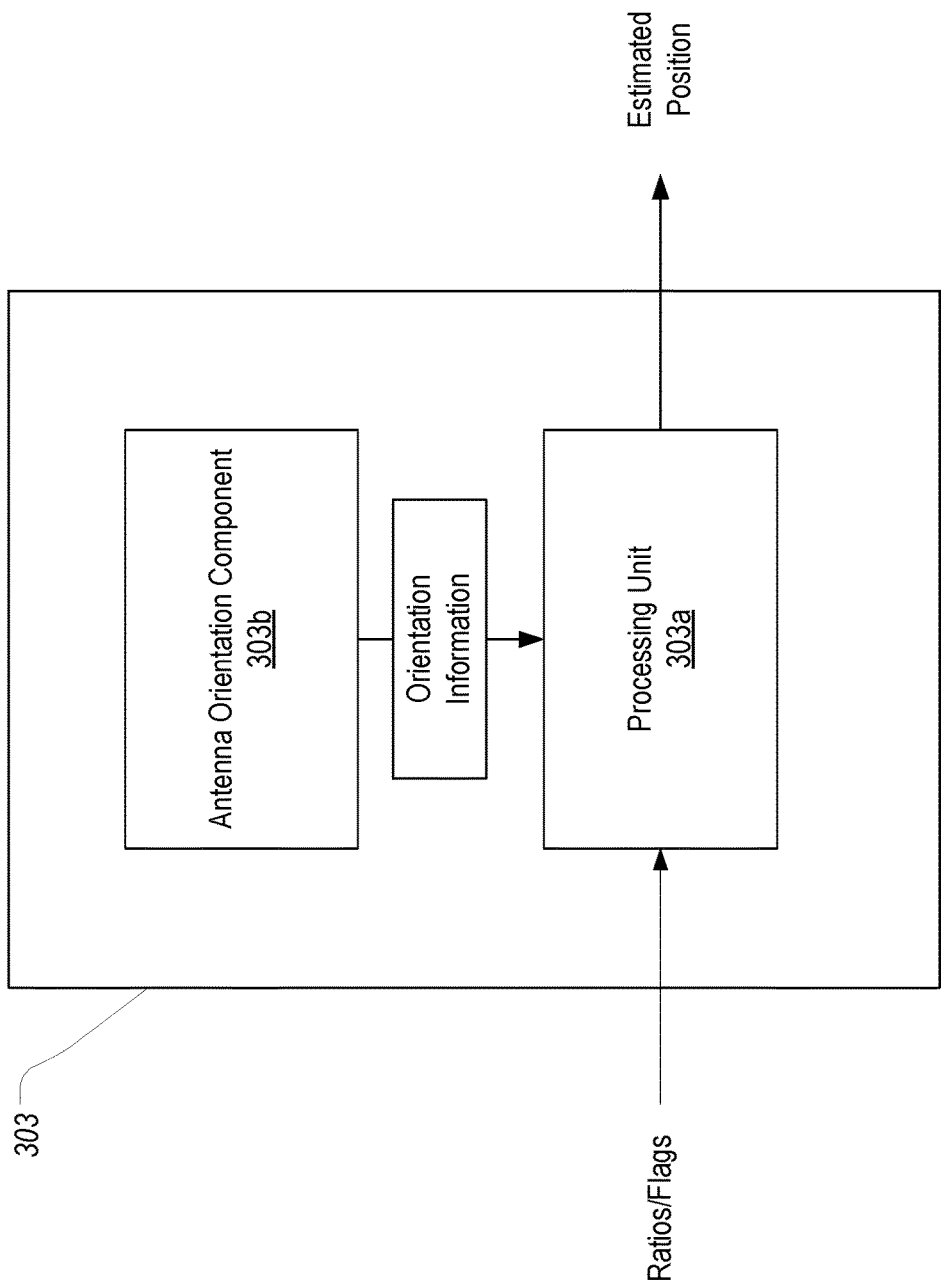
FIG. 4 provides a block diagram of example components of a position estimator that may be employed within the monopulse tracker of the present invention.

FIG. 4 illustrates an example configuration of position estimator 303. As shown, position estimator 303 can include a processing unit 303a which may be in the form of an FPGA, ASIC, processor (e.g., DSP, uP, GPU, etc.), or other processing circuitry that can be programmed to process the ratios in the manner described below. Position estimator 303 can also include an antenna orientation component 303b which generates and/or stores orientation information for each of monopulse antenna systems 201a-201e. For example, in some embodiments, antenna orientation component 303b may include (or be in communication with) a time-varying inertial measurement unit (IMU) which continuously reports an orientation of monopulse tracker 200 or an aircraft or other structure to which monopulse tracker 200 is secured. Processing unit 303a can employ the orientation information generated/stored by antenna orientation component 303b to process each ratio to yield an estimated position of an object. Although FIG. 4 depicts embodiments where position estimator 303 employs a processing unit to process the ratios, in other embodiments, position estimator 303 can be comprised of dedicated hardware components as would be understood by those of skill in the art.

As indicated above, each valid ratio output by an MDA identifies not only that an object is present within the antenna system's field of view, but also to what degree the position of the object deviates from the antenna system's boresight angle in either the elevation or azimuth direction. Position estimator 303 can therefore employ valid ratios (e.g., the ratios for which the corresponding flag has been set) in conjunction with the orientation information for the corresponding monopulse antenna system to estimate the position of the object with respect to monopulse tracker 200.

Figure 4A:
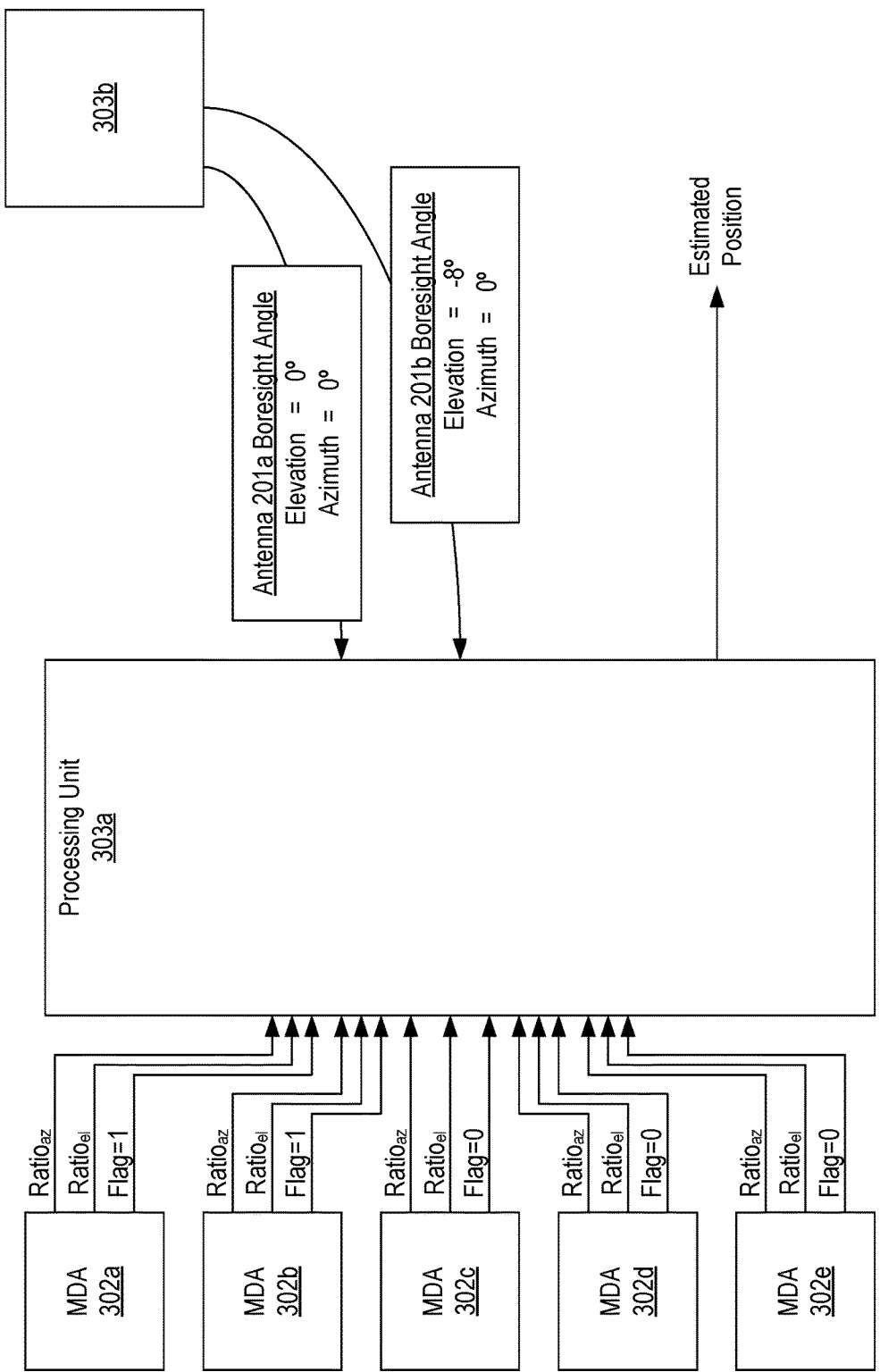
FIG. 4A provides an example of how a position estimator processing unit can employ ratios received from one or more monopulse antenna systems in conjunction with orientation information of those monopulse antenna systems to calculate a precise location of an object relative to the monopulse tracker.

FIG. 4A provides a generalized example of how position estimator 303 can calculate an estimated position of an object. In this example, it will be assumed that the object is only in the field of view of monopulse antenna systems 201a and 201b. Accordingly, MDAs 302a and 302b have determined that their ratio estimates are valid and set the value of their flag to 1 (assuming a value of 1 indicates valid ratios) while MDAs 302c, 302d and 302e have set the value of their flag to 0. Processing unit 303a can detect that the flags from MDAs 302a and 302b are set to 1 and can therefore employ the ratios from MDAs 302a and 302b to estimate the position of the object.

Figure 2C:
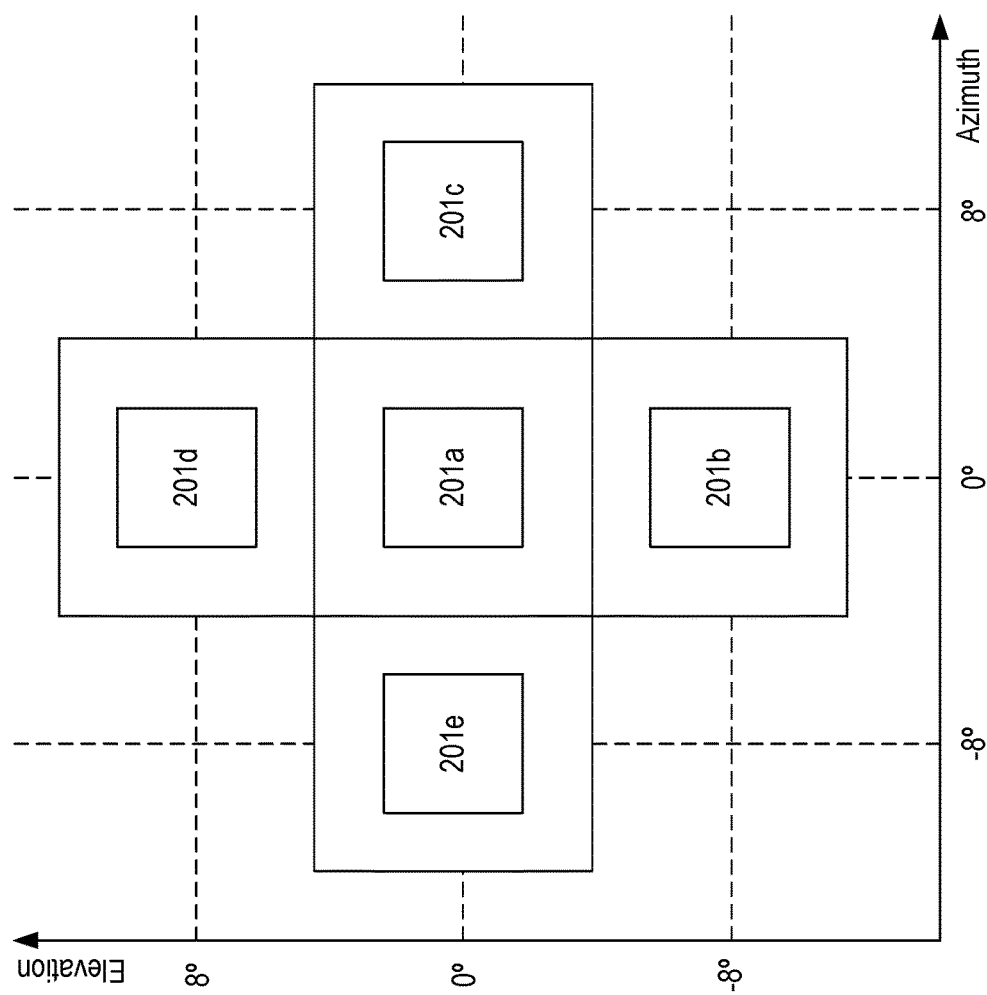
FIG. 2C illustrates an example of the coordinate planes that could be employed for the monopulse tracker.

As shown in FIG. 4A and based on the example coordinate planes shown in FIG. 2C, it will be assumed that orientation information 303b defines the boresight angle of monopulse antenna system 201a as being at 0° elevation and 0° azimuth and the boresight angle of monopulse antenna system 201b as being at −8° elevation and 0° azimuth. In some embodiments, these boresight angles could be hard-coded values that do not change based on the orientation of monopulse tracker 200. However, in other embodiments, monopulse tracker 200 may be configured to track its actual orientation (e.g., via a time-varying ITU) and may then dynamically update the boresight angle of each monopulse antenna system as its orientation changes (e.g., as an aircraft on which monopulse tracker 200 is mounted changes its heading).

Figure 5A:
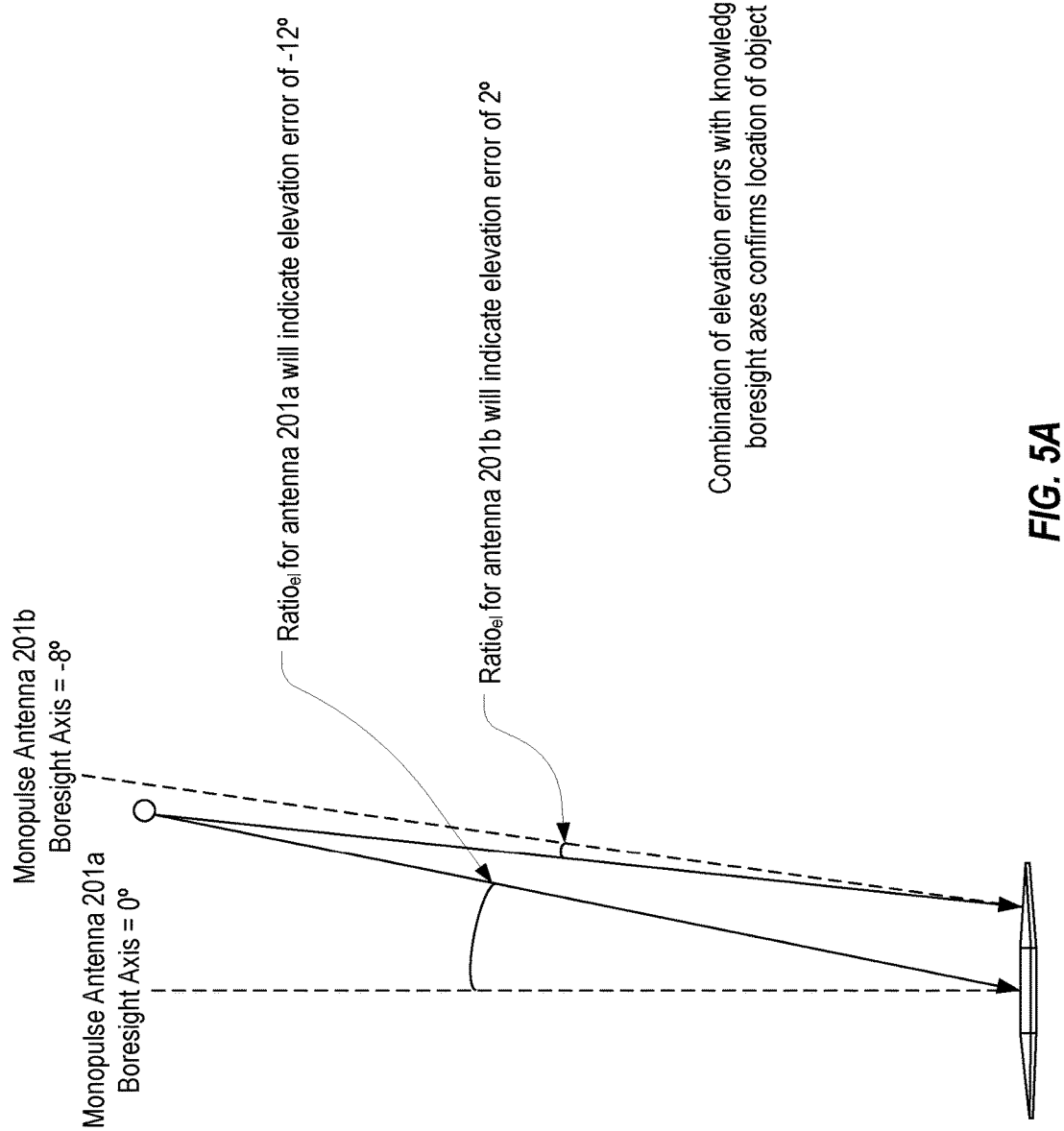
FIG. 5A provides a simplified example of how multiple monopulse antenna systems can generate ratios that can be used to identify the location of an object.

For ease of illustration and as depicted in FIG. 5A, it will be assumed that an object is present in a plane that extends vertically from the first axis and that monopulse tracker 200 is positioned horizontally (i.e., parallel to the ground). As shown, this object is positioned at a 12° angle to the right of the boresight angle of monopulse antenna system 201a. Since the boresight angle of monopulse antenna system 201a is at 0°, MDA 302a will produce an elevation ratio representing a −12° deviation from the boresight angle. On the other hand, the object is positioned at a 2° angle to the left of the boresight angle of monopulse antenna system 201b, and therefore, MDA 302b will produce an elevation ratio representing a 2° deviation. For simplicity, the azimuth ratio will be ignored in this example.

Upon receiving the elevation ratios from MDAs 302a and 302b (and based on the flags for MDAs 302a and 302b being set), position estimator 303 can obtain/employ the known orientation information for monopulse antenna systems 201a and 201b in conjunction with the received ratios to calculate a precise position of the object. As one of skill in the art would know how to calculate a position of an object using a single monopulse antenna system, a detailed description of this process will not be provided. Suffice it to say that the present invention can employ the ratios that are concurrently received from more than one monopulse antenna system to estimate a more precise position of the object (i.e., a position (or angle and azimuth deviation) that is relative to monopulse tracker 200 as opposed to a single monopulse antenna system). This position relative to monopulse tracker 200 (and therefore relative to whatever structure monopulse tracker 200 may be mounted to) can then be employed as necessary, such as, for example, to maintain a communication link with the object.

Because monopulse tracker 200 does not need to be steered and will typically be mounted to a moving aircraft or vehicle, it will typically be necessary to track the orientation of monopulse tracker 200 as suggested above. For example, with reference to the assumed orientations in the example above, monopulse antenna system 201d will not always be oriented towards 0° (with respect to monopulse antenna system 201a) and monopulse antenna system 201a will not always be pointed directly upward. Accordingly, in such cases, the relative position estimated from the ratios produced by one or more monopulse antenna systems may need to be resolved against the actual orientation of monopulse tracker 200, particularly when the position will be relied upon by a system that does not have the same orientation as monopulse tracker 200 (e.g., a system that is not on the same aircraft as monopulse tracker 200). In short, in some embodiments, position estimator 303 may be configured to output an estimated position that is relative to monopulse tracker 200's current orientation, while in other embodiments, position estimator 303 may be configured to output an estimated position that is relative to true north and the horizon. Although monopulse tracker 200 does not need to be steered, in some embodiments, it may be desirable to steer monopulse tracker 200. In such cases, it may not be necessary to employ orientation information of the monopulse antenna systems.

From the simplified example in FIG. 5A, it can be seen that the ratios received from one monopulse antenna system can be employed to calculate an object's position and then the ratios received from another monopulse antenna system can be employed to verify/improve the calculated position. For example, in some cases, multiple monopulse antenna systems may each report a slightly different position for the object (e.g., a cluster of three positions may be produced when the object is in the field of view of three monopulse antenna systems). In such cases, position estimator 303 can process the calculated positions to produce a single, accurate position. For example, position estimator 303 may average the calculated positions to produce a single point between the positions. In some cases, a weighted average may be employed in which the angle of deviation from the boresight angle is employed. In particular, when the angle of deviation from a monopulse antenna system's boresight angle is small, the position calculated by that system may be weighted more heavily. This is based on the assumption that a monopulse antenna system will report a more precise location when the object is closer to its boresight angle and therefore the position calculated for that monopulse antenna system should be weighted more heavily.

Figure 5B:
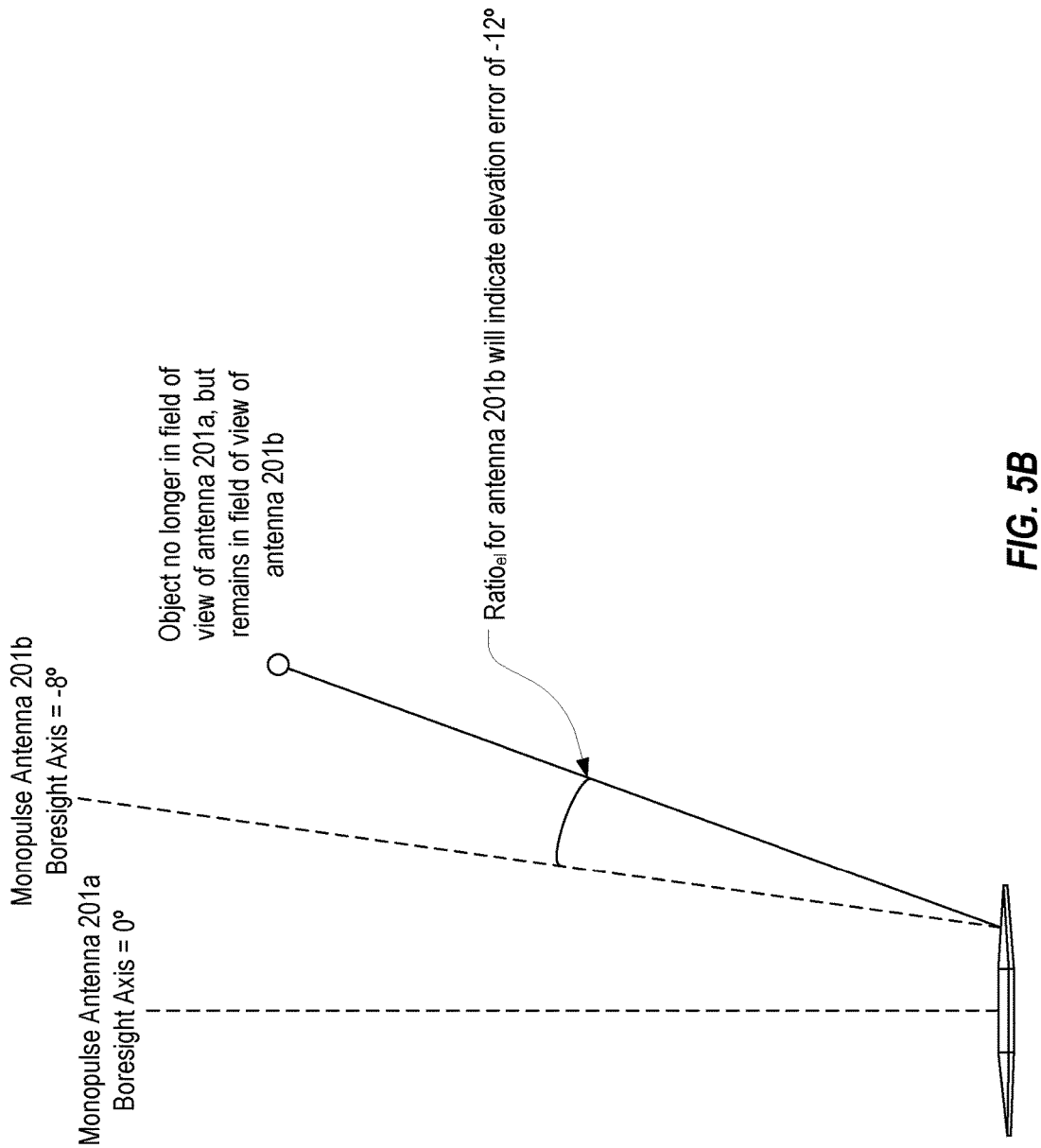
FIG. 5B illustrates how the object in FIG. 5A can be tracked over a larger field of view.

In addition to improving the accuracy of an estimated position, monopulse tracker 200 also expands the field of view for tracking an object. In particular, due to the tilting of monopulse antenna systems 201b-201d with respect to monopulse antenna system 201a, monopulse tracker 200 will have a combined field of view that is much larger than that of a single monopulse antenna system. For example, as shown in FIG. 5B, it is assumed that the object depicted in FIG. 5A has moved relative to monopulse tracker 200 such that it is no longer within the field of view of monopulse antenna system 201a. However, even with this movement, the object remains in the field of view of monopulse antenna system 201b thereby allowing monopulse tracker 200 to continue to track the object's position without needing to steer monopulse tracker 200. In the case where monopulse tracker 200 is mounted to an aircraft and the object is a projectile, this will allow the projectile to be tracked (e.g., for the purpose of maintaining a communication link with the projectile) over a large area with minimal or no adjustment to the aircraft's orientation.

In some embodiments, monopulse tracker 200 can be configured to track multiple objects simultaneously. This can be accomplished by using pulses of different frequencies. For example, if a first object is in the field of view of monopulse antenna systems 201b and 201c, and a second object is in the field of view of monopulse antenna systems 201a and 201d, systems 201b and 201c can be driven with a first frequency pulse and system 201a and 201d can be driven with a second frequency pulse. In this case, position estimator 303 can process the ratios corresponding to systems 201b and 201c separately from the ratios corresponding to systems 201a and 201d to thereby produce two separate estimated positions corresponding to the two objects.

To control which frequencies are employed by which monopulse antenna systems and to control how position estimator 303 handles multiple sets of valid ratios, monopulse tracker 200 can include control circuitry. In some cases, processing unit 303a may function as the control circuitry, while in others, separate control circuitry may be employed. This control circuitry can be configured to receive user input specifying that multiple objects should be tracked simultaneously including an indication of where each object is relative to monopulse tracker 200. In response, the control circuitry can cause the appropriate monopulse antenna systems to employ the appropriate frequencies to enable simultaneous tracking of multiple objects. In some embodiments, the control circuitry can be configured to automatically identify when multiple objects may be present within the combined field of view of monopulse tracker 200 and cause the appropriate monopulse antenna system(s) to commence using a different frequency to enable simultaneous tracking. For example, if position estimator 303 receives valid ratios from multiple monopulse antenna systems having fields of view that do not overlap, it can be assumed that multiple objects are present.

In other embodiments, monopulse tracker 200 can be configured to track multiple objects simultaneously using multiple emitting frequencies. For example, if a first object is in the field of view of monopulse tracker 200 and is emitting at a first frequency, and a second object is also in the field of view of monopulse tracker 200 and is emitting at a second frequency, then using frequency filtering, position estimator 303 can process the ratios corresponding to the first object separately from the ratios corresponding to the second object to thereby produce two separate estimated positions corresponding to the two objects.

In still another embodiment, monopulse tracker 200 can be configured to track multiple objects simultaneously using time separation between emissions so position estimator 303 can process the ratios corresponding to the first object separately from the ratios corresponding to the second object to thereby produce two separate estimated positions corresponding to the two objects.

In still another embodiment, monopulse tracker 200 can be configured to track multiple objects simultaneously using spread spectrum techniques. Each object can be configured to emit unique emissions so position estimator 303 can process the ratios corresponding to the first object separately from the ratios corresponding to the second object to thereby produce two separate estimated positions corresponding to the two objects.

In short, monopulse tracker 200 can employ a number of different techniques to allow one or more objects to be tracked in scenarios where monopulse tracker 200 employs radar techniques as well as in scenarios where monopulse tracker 200 receives emissions from the object(s) being tracked. Due to the structure of monopulse tracker 200, these one or more objects can be tracked simultaneously without needing to steer the tracker.

Although monopulse tracker 200 is shown with five monopulse antenna systems, a monopulse tracker in accordance with embodiments of the present invention may be configured with a different number of monopulse antenna systems that are arranged in different orientations. For example, a monopulse tracker may have a top monopulse antenna system similar to monopulse tracker 200 but may have more or less than four side monopulse antenna systems. Alternatively, a monopulse tracker may have multiple "top" monopulse antenna systems and a number of additional monopulse antenna systems positioned around these top systems. In short, the housing of a monopulse tracker may have any reasonable number of sides and may include a monopulse antenna system in some or all of these sides to thereby create a combined field of view suitable for a particular application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A monopulse tracker comprising:
    a housing having a first surface containing a monopulse antenna system and multiple additional surfaces angled from the first surface, each additional surface also containing a monopulse antenna system such that the monopulse tracker includes at least three monopulse antenna systems;
    one or more comparators configured to generate a set of channels including a sum channel, an elevation difference channel, and an azimuth difference channel for each of the at least three monopulse antenna system such that at least three sets of channels are generated;
    one or more monopulse detector assemblies configured to generate a set of ratios including an elevation ratio and an azimuth ratio for each of the at least three monopulse antenna systems by processing the sum channel, the elevation difference channel, and the azimuth difference channel for the respective monopulse antenna system such that at least three sets of ratios are generated; and
    a position estimator configured to receive the at least three sets of ratios and to generate an estimated position of an object based on the elevation and azimuth ratios in each of the three sets of ratios.

2. The monopulse tracker of claim 1, wherein the first surface extends along a plane defined by a first axis and a second axis, and wherein the multiple additional surfaces comprise a first set of two side surfaces that are positioned on opposite sides of the first surface at an acute angle from the first axis and a second set of two side surfaces that are positioned on opposite sides of the first surface at an acute angle from the second axis.

3. The monopulse tracker of claim 2, wherein the acute angle from the first axis is between 5° and 15° and the acute angle from the second axis is between 5° and 15°.

4. The monopulse tracker of claim 2, wherein the acute angle from the first axis and the acute angle from the second axis are selected to cause a field of view of the monopulse antenna systems contained in each side surface in the first and second sets to intersect with a field of view of the monopulse antenna system contained in the first surface.

5. The monopulse tracker of claim 4, wherein the field of view of the monopulse antenna system contained in each additional surface intersects with each field of view of the monopulse antenna systems contained in two adjacent additional surfaces.

6. The monopulse tracker of claim 1, wherein the position estimator is configured to generate an estimated position for each of multiple objects based on the elevation and azimuth ratios in each of the three sets.

7. The monopulse tracker of claim 1, wherein the one or more monopulse detector assemblies comprise a single monopulse detector assembly that employs time-multiplexing to generate the set of ratios for each of the at least three monopulse antenna systems.

8. The monopulse tracker of claim 1, wherein, for each of the at least three monopulse antenna system, the one or more monopulse detector assemblies generate discrimination information defining whether the elevation and azimuth ratios in the corresponding set of ratios represent the presence of an object in the corresponding monopulse antenna system's field of view.

9. The monopulse tracker of claim 8, wherein generating the estimated position of the object based on the elevation and azimuth ratios in each three sets comprises generating the estimated position using only the elevation and azimuth ratios for which the corresponding discrimination information represents the presence of the object in the corresponding monopulse antenna system's field of view.

10. The monopulse tracker of claim 1, wherein the position estimator generates the estimated position by:
    for each of at least two of the at least three monopulse antenna systems, calculating a position of the object based on the corresponding set of ratios; and
    combining the two or more calculated positions to yield the estimated position of the object.

11. A monopulse tracker comprising:
    a housing having a first surface that extends along a plane defined by a first axis and a second axis, a first set of side surfaces that extend from opposing sides of the first surface at an acute angle from the first axis, and a second set of side surfaces that extend from opposing sides of the first surface at an acute angle from the second axis, the first surface and each side surface in the first set and the second set including a monopulse antenna system such that the monopulse tracker includes five monopulse antenna systems;
    circuitry configured to generate, for each of the five monopulse antenna systems, a set of ratios including an elevation ratio and an azimuth ratio such that five sets of ratios are generated; and a position estimator configured to receive the five sets of ratios and to estimate a position of an object based on the elevation ratio and the azimuth ratio in each of the live sets ratios.

12. The monopulse tracker of claim 11, wherein the position estimator estimates the position of the object using the elevation ratio and the azimuth ratio in each of two or more of the five sets of ratios.

13. The monopulse tracker of claim 12, wherein estimating the position of the object using the elevation ratio and the azimuth ratio in each of the two or more of the five sets of ratios comprises:
- calculating a position from the elevation ratio and the azimuth ratio for each of the two or more of the five sets of ratios such that two or more positions are calculated; and
- combining the calculated positions to yield the estimated position.

14. The monopulse tracker of claim 11, wherein the position estimator employs known orientation information of the five monopulse antenna systems in conjunction with the five sets of ratios to estimate the position of the object.

15. The monopulse tracker of claim 11, wherein the estimated position is relative to an orientation of the monopulse tracker.

16. A method for estimating a position of an object using a monopulse tracker that includes multiple monopulse antenna systems without steering the monopulse tracker, the method comprising:
- receiving a set of ratios including an elevation ratio and an azimuth ratio for each of two or more monopulse antenna systems that are positioned in the monopulse tracker in different orientations such that two or more sets of ratios are received;
- for each of the two or more sets of ratios, processing the elevation and azimuth ratios in the set to calculate a position of an object relative to a boresight angle of the respective monopulse antenna system such that two or more positions are calculated; and
- based on known orientation information defining a boresight angle of each of the two or more monopulse antenna systems, combining the two or more calculated positions to generate a single estimated position of an object in a field of view of the two or more monopulse antenna systems.

17. The method of claim 16, wherein receiving the set of ratios for each of the two or more monopulse antenna systems comprises receiving discrimination information identifying that the set of ratios represent the presence of an object in a field of view of each of the two or more monopulse antenna systems.

18. The method of claim 16, wherein combining the two or more calculated positions comprises averaging the two or more calculated positions.

19. The method of claim 16, wherein the single estimated position is relative to a current orientation of the monopulse tracker.

20. The method of claim 16, wherein the orientation information defines the boresight angle of one monopulse antenna system relative to a boresight angle of another monopulse antenna system included in the monopulse tracker.

* * * * *